(12) United States Patent
Palmlöf

(10) Patent No.: US 8,143,350 B2
(45) Date of Patent: Mar. 27, 2012

(54) POLYETHYLENE COMPOSITION FOR THE PRODUCTION OF PEROXIDE CROSSLINKED POLYETHYLENE

(75) Inventor: Magnus Palmlöf, Västra Frölunda (SE)

(73) Assignee: Borealis Technology Oy, Porvoo (FI)

( * ) Notice: Subject to any disclaimer, the term of this patent is extended or adjusted under 35 U.S.C. 154(b) by 519 days.

(21) Appl. No.: 10/543,421

(22) PCT Filed: Jan. 30, 2003

(86) PCT No.: PCT/SE03/00151
§ 371 (c)(1),
(2), (4) Date: May 16, 2006

(87) PCT Pub. No.: WO2004/067610
PCT Pub. Date: Aug. 12, 2004

(65) Prior Publication Data
US 2006/0269712 A1    Nov. 30, 2006

(51) Int. Cl.
*C08F 236/16*  (2006.01)
(52) U.S. Cl. .......... 525/192; 264/340; 264/13; 526/252; 428/357; 428/36.9; 428/402
(58) Field of Classification Search ................. 264/340, 264/13; 526/252; 428/357, 36.9, 402, 252; 525/192
See application file for complete search history.

(56) References Cited

U.S. PATENT DOCUMENTS

| | | | | |
|---|---|---|---|---|
| 4,144,111 A | * | 3/1979 | Schaerer | 156/187 |
| 4,528,155 A | | 7/1985 | Elder | |
| 5,662,963 A | * | 9/1997 | Hishida | 427/212 |

FOREIGN PATENT DOCUMENTS

| | | |
|---|---|---|
| DE | 1 494 046 A1 | 1/1969 |
| EP | 0 088 370 A2 | 9/1983 |
| EP | 0088370 A2 * | 9/1983 |
| EP | 0 423 590 A2 | 4/1991 |
| GB | 1025672 | 4/1966 |
| JP | 07-130238 | 5/1995 |
| WO | 00/35646 | 6/2000 |

OTHER PUBLICATIONS http://www.powderandbulk.com/resources/bulk_density/material_bulk_density_chart_p.htm.
European Search Report dated Jul. 19, 2007.
Kitao, K. "Effect of Entanglement on Brittle-Ductile Transition in Polyethylene", Polymer Engineering and Science, vol. 41, No. 7, Jul. 2001, pp. 1146-1155.
Gupta, J. et al. "Absorption of Dicumyl Peroxide by Extruded Polyethylene: Difference between Surface and Bulk Morphology", Journal of Applied Polymer Science, vol. 29, 1984, pp. 2383-2393.
Data Sheet on Ipethene 320, Carmel Olefins Ltd., 4 pgs., May 16, 2006, printed Aug. 24, 2009, www.carmel-olefins.co.il/Products.
Bulk Density Table, Brabender Technologie, Document 1500-C01-2, 6 pgs, www.brabenderti.com, printed Aug. 24, 2009.
Siegel, W., "Pneumatische Förderung: Grundlagen, Auslegung, Anlagenbau, Betrieb", 1st edition, Würzburg, 1991, pp. 92-93.
Indian Office Action for corresponding Indian Patent Application No. 1747/CHENP/2005, dated Apr. 27, 2010.

* cited by examiner

Primary Examiner — Christina Johnson
Assistant Examiner — Saeed M Huda
(74) Attorney, Agent, or Firm — Merchant & Gould P.C.

(57) ABSTRACT

The invention relates to a polyethylene composition for the production of peroxide crosslinked polyethylene and a method for the production thereof. The invention further relates to the use of such a polymer composition and to a peroxide crosslinked polyethylene pipe made from the polyethylene composition.

5 Claims, No Drawings

POLYETHYLENE COMPOSITION FOR THE PRODUCTION OF PEROXIDE CROSSLINKED POLYETHYLENE

FIELD OF THE INVENTION

The present invention relates to a polyethylene composition for the production of peroxide crosslinked polyethylene and a method for the production thereof. The invention further relates to the use of such a polymer composition and to a peroxide crosslinked polyethylene pipe made from the polyethylene composition

BACKGROUND OF THE INVENTION

Peroxide crosslinked polyethylene (PEX-a) pipes are prepared by soaking polyethylene (PE) material in contact with peroxides under an adequate period of time, often at elevated temperatures. For the formation of a three dimensional network to occur, where crosslinks tie the crystalline areas together in coexistence with a certain quantity of non-crosslinked molecules, heat is required to bring about the crosslinking. Subsequently, the PEX-a material may be processed to pipes in, e g an Engel extruder (ram extruder). The polyethylene material has to be well penetrated by peroxides prior to processing. The penetration of peroxides is enhanced by smaller particle sizes of the polyethylene since then the penetration of the peroxide into the voids of the particles will proceed more rapidly. Hence, polyethylene in powder form will be penetrated in a shorter time than PE pellets of standard sizes.

At present, polyethylene is supplied for peroxide crosslinked polyethylene, PEX-a, production as either powder, having an average particle size of 0.9 mm or pellets, with a particle size of 55-65 pellets/g. For the production of uncoloured PEX-a, polyethylene powder is used since PE is uncoloured, i e has a natural colour, by nature. However, the handling of polyethylene in powder form is associated with a number of drawbacks. For instance, it is not possible to manufacture coloured PEX-a by using powder PE since it is extremely difficult, if not impossible, to successfully mix colour pigments with powder PE. Other additives, such as antioxidants, may be dry mixed into the powder before processing. However, dry mixing involves problems with dust and the risks for dust explosions.

Another disadvantage involved with powder handling is the relatively low bulk density of powder, which is approximately 0.45-0.5 kg/m$^3$, resulting in large volumetric volumes to transport and store. Also the sometimes poor dry flow properties of powder causes problems with the handling of the powder both for polymer producers as well as for pipe producers.

In order to manufacture coloured PEX-a pipes, PE pellets are used. This is because it is necessary to compound the colour pigments into the polyethylene material before processing. Pellets presently used for PEX-a production are relatively big pellets with a number of pellets per gram of approximately 20-30 pellets/g and up to 65 pellets/g, having a diameter of about 3-5 mm and a length of about 3-4 mm. As mentioned above pellets of large sizes result in extensive soaking times and often combined with high soaking temperatures. Normally, the pellet size distribution may involve some very big pellets which consequently lead to even longer soaking times, since the soaking time is proportional to the square of the distance from the particle surface to the centre of the particle.

In WO 00/35646 a method of producing pelletized polyolefin for rotational moulding is disclosed, having a particle size distribution of 0.1 to 1 mm, preferably 0.2 to 0.9 mm and a low water content of less than 0.1 weight %. These very dry pellets may be produced by mixing, pelletization and drying.

SUMMARY OF THE INVENTION

It is therefore an object of the present invention to provide a polyethylene composition for the production of peroxide crosslinked polyethylene, wherein the above mentioned drawbacks are eliminated or at least alleviated.

For this purpose a polyethylene composition is provided which has the benefits of shorter soaking times at lower temperatures compared to previously used polyethylene compositions in powder or pellet form and at the same time is possible to successfully mix with additives such as, e g colour pigments.

According to the invention this object has been achieved by a polyethylene composition for the production of peroxide crosslinked polyethylene, characterised in that said polyethylene composition is pelletized to an average particle size of less than 0.020 cm$^3$.

Mixing of additives, such as e g colour pigments into the pelletized polyethylene composition is still possible by means of a well adapted compounding machine and a subsequent pelletizing equipment. In this way the dispersion of additives in crosslinked polyethylene is facilitated.

Further, and importantly, the penetration of peroxides into the polyethylene pellets is facilitated by the reduced average particle size of the pellets. Consequently the soaking times required may be reduced and the soaking temperatures lowered.

According to a preferred embodiment the average particle size of the pelletized polyethylene is less than 0.015 cm$^3$, preferably less than 0.011 cm$^3$.

According to another preferred embodiment the number of pellets per gram is >73.

According to yet another preferred embodiment the pelletized polyethylene has a bulk density of about 550 kg/m$^3$. This bulk density is about 30% higher compared to the bulk density of powder. Consequently, the volume of pelletized polyethylene compositions is significantly lower than the volume of powder which in practise means that the costs for transportation and storage may be lowered accordingly. The environmental benefits are also considerable. Moreover, due to the higher bulk density the risk for hazardous dust explosions are reduced.

According to another preferred embodiment the pelletized polyethylene is crosslinkable to a degree of crosslinking of >70%, as measured according to ASTM D2765-95.

According to yet another preferred embodiment the pelletized polyethylene composition is mixed with at least one additive chosen from the group of antioxidants, fillers, colouring pigments, stabilizers, UV-absorbers, antistatics, lubricants, peroxides and silanes.

As mentioned above the mixing of additives into the polyethylene composition is possible by means of ordinary equipment. In this way the dispersion of additives in crosslinked polyethylene will be more evenly distributed in a crosslinked PE made from the pellets of the present invention.

By the present invention a PE composition is provided which has an even particle distribution having the advantage of avoiding sources of cracks and failure in a ready made product. The average size of the pellets is easy to control and therefore a more even quality is possible to achieve. Moreover, it is easier to obtain well defined process parameters.

Another object of the present invention is to provide a method for the production of a peroxide crosslinked polyethylene.

This object has been achieved by soaking a polyethylene composition in peroxide.

Yet another object of the invention is to provide a new use of a polyethylene composition for the production of a peroxide crosslinked polyethylene.

A further object of the present invention is to provide a peroxide crosslinked polyethylene pipe made from the polyethylene composition.

Although powder handling has been used for many years for the production of peroxide crosslinked pipes it is not until recently interest has been directed towards pellets in order to facilitate the handling of the product and to easier achieve an even quality level. By using smaller and more homogenous pellets, oversized particles are avoided and a better controlled peroxide soaking process is obtained. Less peroxide will be required and a more even quality level is easier to maintain. In addition less decomposition products are likely to form resulting in less taste and odour in, e g water conveyed in the pipe of the invention.

The present invention is suitable for moulding products, such as rotational moulding, injection moulding and blow moulding products, but also for thermoforming and extrusion products.

Other objects, features, advantages and preferred embodiments of the present invention will become apparent from the following detailed description when taken in conjunction with the appended claims.

DETAILED DESCRIPTION OF PREFERRED EMBODIMENTS

The polyethylene composition for the production of peroxide crosslinked polyethylene according to the invention may be produced from a dry polyethylene in pelletized or unpelletized form, optionally reactor grade polymer or molten polymer. The PE may typically be produced by a polymerization process catalysed by Ziegler-Natta, chromium based, metallocene, or other single site catalysts, or by a high pressure process. The polyolefin may have a narrow or broad molecular weight distribution. The polyolefin conveniently has an MFR 2.16 (a melt flow rate 2.16) in the range of 0.05-35, especially 0.05-10. PE of density 973 to 920 kg/m$^3$ is especially preferred.

Any colouring agent is preferably used in the form of a master batch, i e already mixed with a polymer, generally the same or similar polymer as the initial feedstock. LDPE is convenient to use in this regard.

The colouring agent may be an inorganic or organic material such as are conventionally used in moulded or extruded polyolefin products. Carbon black is particularly preferred.

Initial feedstock, colouring agent and any other desired additives, e g UV stabilizers, antioxidants, antistatic agents, etc., can be fed to an extruder, a mixer or a melt pump by a control system that ensures the components are homogeneously mixed in the desired ratio.

Depending on the needs of mixing and whether the polymer is already molten, a mixer, extruder or melt pump may be used to mix the components and build up the pressure necessary to ensure proper flow through the orifices of the die. The additives and polymer are fed to a mixer/homogenizer to create a homogeneous feed stream for the extruder. If desired, the additives may be mixed with a portion of the polymer to create an additive masterbatch and this may be fed to the extruder together with the remaining polymer. The die plate should be of a form capable of withstanding the pressures required for extrusion of the molten polymer and the orifices should be of a diameter such that pellets of the desired size are formed.

Generally orifice diameters will be in the range 0.05 to 2.0 mm, more preferably 0.1 to 0.8 mm, still more preferably 0.2 to 0.4 mm. For industrial, large scale operation, the die-plate conveniently will contain a plurality of such orifices, e g 1000-50000 and be capable of extruding at least 0.25 ton/hour more preferably at least 1 ton/hour.

The pelletizer may conveniently be an underwater pelletizer operating by rotating a cutter across the downstream face of the die plate in the presence of water which cools the melt causing it to solidify quickly. The speed at which the pelletizer operates is selected according to the die plate size and number of orifices and to achieve the desired pellet size and shape.

After the pellets are dried to the desired level, they will desirably be screened to remove the coarse and if necessary the fines fractions. The dried and screened polyethylene pellets may then be conveyed for example by a normal pneumatic conveying system to be packaged and stored.

According to the invention the polyethylene composition is pelletized to an average particle size of less than 0.020 cm$^3$, preferably less than 0.015 cm$^3$. This particle size corresponds to about 73 pellets/g of a polyethylene composition having a density of 923 kg/m$^3$. More preferably the average particle size of the pelletized polyethylene is less than 0.011 cm$^3$. This particle size corresponds to about 100 pellets/g of a polyethylene composition having a density of 923 kg/m$^3$. Further, the pelletized polyethylene has a bulk density of about 550 kg/m$^3$, as measured according to ASTM D1895-89. In table 1 below the particle volumes are shown as a function of the PE density and the pellet weight, given as the number of pellets per gram.

TABLE 1

| PE-Density g/cm$^3$ | 100 pellets/g Particle volume (cm$^3$) | 75 pellets/g Particle volume (cm$^3$) | 73.5 pellets/g Particle volume (cm$^3$) |
|---|---|---|---|
| 0.923 | 0.0108 | 0.0144 | 0.0147 |
| 0.955 | 0.0105 | 0.0140 | |
| 0.975 | 0.0103 | 0.0137 | |

Dispersion of additives such as fillers and antioxidants would be facilitated with a pellets approach. Small pellets further give smaller particles with the same small penetration distance from the particle surface to the centre of the particle as have powder particles, normally used for the purpose. Hence the problems with dispersion of pigments and potentially other additives would be solved by using pelletized PE. By using small pellets the short penetration time of peroxides into powders would in addition be maintained.

Pellets used for PEX-a production today may give some very big pellets which can result from a normal pellet size distribution. Non soaked or not homogeneously soaked pellets can cause inhomogeneous pipes giving rise to failures in pressure testing. By using small pellets the risk for oversized pellets that cannot be homogeneously penetrated by peroxide in reasonable time would be avoided.

The dry flow properties of the pelletized PE composition are most likely to improve. In this way the costly and worker-unfriendly grinding step of the conventional process for production of powder can be avoided. Furthermore the pellets are easier to handle than the ground powder and easier to transport using conventional conveying systems, e g due to dry flow capability. Moreover, having a higher bulk density, the pellets have advantage both in terms of storage and transportation volume and in terms of the PEX-a process itself.

By virtue of the pelletization process, any additives (e g stabilizers (for example heat or radiation stabilizers such as UV-stabilizers, in particular HALS (Hindered amine light stabilizers)), coloring agents, antistatics, antioxidants (e g phenolic and phosphitic antioxidants), lubricants, peroxides and silanes, etc in the mixture being pelletized are distributed very uniformly in the resulting pelletize pellets. This results in a high degree of homogeneity within and between the pellets.

The present invention will now be illustrated by way of non-limiting examples of preferred embodiments in order to further facilitate the understanding of the invention.

EXAMPLES

Example 1

Pigment Dispersion in PEX-a Pipe

Yellow, blue and black pellets were mixed in an Engel extruder (ram extruder) and the result was a very inhomogeneous 32×3 mm pipe where the individual pellets/colours were still well distinguishable.

Example 2

Bulk Density

Bulk density was measured to be 32% higher for pellets as compared to powder. In practice this means 0.60 $m^3$/ton.

Example 3

Soaking Time

In order to show the positive effect on soaking performance of small pellets compared to normal sized pellets, two different PE materials were melt compounded and pelletized in a compounding machine. One PE was prepared by a Singel Site Catalyst, SSC; and the other by a chromium catalyst. Each of the materials were pelletized in two different pellet sizes; big and small, see Table 2. The resulting pellet size was measured as no of pellets/g. The pellets were then mixed with 0.7 weight % peroxide in a tumble mixer consisting of a sealed glass jar that allowed for soaking of the peroxide during 17 h at room temperature, constantly tumbling.

Test plaques were then prepared from the soaked pellets and a Rheograph analysis was made at 200° C. The torque was measured continuously vs. time until the torque value levelled off. The maximum torque is given in Table 1. The degree of crosslinking was then measured on these plaques according to ASTM D2765-95 to see the corresponding degree of crosslinking, see Table 2.

TABLE 2

|  | SSC | | Chromium | |
|  | small | big | small | big |
| Pellet size pellets/g | 130 | 30 | 99 | 19 |
| Torque (Nm) | 0.98 | 0.81 | 1.65 | 1.53 |
| Degree of crosslinking (%) | 76 | 63 | 100 | 99 |

The invention claimed is:

1. A polyethylene composition for the production of peroxide crosslinked polyethylene pipes, wherein said polyethylene composition has a density of 920-973 $kg/m^3$ and a $MFR_{2.16}$ of 0.05-35, said polyethylene composition is in the form of pellets having an average pellet particle size of 0.006 $cm^3$ to 0.020 $cm^3$, and wherein the polyethylene in the form of pellets is crosslinkable to a degree of crosslinking of at least 70%, as measured according to ASTM D2765-95, wherein the polyethylene in the form of pellets has a bulk density of about 550 $kg/m^3$ as measured according to ASTM D1895-89.

2. A composition as claimed in claim 1, wherein the number of pellets per gram is greater than 73.

3. A composition as claimed in claim 1, wherein the polyethylene composition in the form of pellets is mixed with at least one additive.

4. A composition as claimed in claim 3, wherein said additive is selected from the group consisting of antioxidants, fillers, colouring pigments, stabilizers, UV-absorbers, antistatics lubricants, peroxides, and silanes.

5. A composition as claimed in claim 1, wherein said polyethylene composition in the form of pellets have an average pellet particle size of 0.010 $cm^3$ to 0.020 $cm^3$.

* * * * *